United States Patent
Sabol et al.

(10) Patent No.: US 6,748,044 B2
(45) Date of Patent: Jun. 8, 2004

(54) COMPUTER ASSISTED ANALYSIS OF TOMOGRAPHIC MAMMOGRAPHY DATA

(75) Inventors: John M. Sabol, Sussex, WI (US); Gopal B. Avinash, New Berlin, WI (US); Matthew J. Walker, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 24 days.

(21) Appl. No.: 10/243,056

(22) Filed: Sep. 13, 2002

(65) Prior Publication Data

US 2004/0052328 A1 Mar. 18, 2004

(51) Int. Cl.$^7$ .................................... A61B 6/03
(52) U.S. Cl. ..................... 378/4; 378/37; 378/901; 250/363.04; 250/370.09
(58) Field of Search .......... 378/4, 8, 15, 901; 250/363.04, 370.09; 382/131

(56) References Cited

U.S. PATENT DOCUMENTS 6,574,304 B1 * 6/2003 Hsieh et al. ................ 378/62
2003/0118223 A1 * 6/2003 Rahn et al. ................. 382/131

* cited by examiner

Primary Examiner—David V Bruce
(74) Attorney, Agent, or Firm—Fletcher Yoder, P.C.

(57) ABSTRACT

The present technique provides a method and system for generating tomographic mammography data and processing the data using a computer aided detection and diagnosis (CAD) algorithm. The CAD algorithm may perform various types of analysis, including segmentation, feature extraction, and feature classification. The acquired data may be processed in parallel by the CAD algorithm such that information derived from one processing path may be used to enhance or alter the processing of data in a parallel processing path. The processed data may be used to provide an enhanced mammographic image with features of interest marked for inspection by a radiologist. The features of interest may also be classified to aid the inspection by the radiologist.

62 Claims, 7 Drawing Sheets

DETECTOR NUMBER

COMPUTER ASSISTED ANALYSIS OF TOMOGRAPHIC MAMMOGRAPHY DATA

BACKGROUND OF THE INVENTION

The present invention relates generally to medical imaging procedures. Particularly, the present invention relates to a technique for utilizing computer aided detection or diagnosis (CAD) techniques in conjunction with tomographic mammography.

In the developed countries, one out of every eight women develops breast cancer during her lifetime. Among women today, breast cancer is only second to lung cancer in the fatality rate due to cancer. However, the chance of recovery from breast cancer is high if the cancer is detected in its early stages. As awareness and imaging technology have improved, the likelihood of early detection and diagnosis, and therefore, the survival rate for breast cancer has improved in recent years.

In particular, X-ray mammography, both the traditional film version and the more recent digital implementation, has proven effective in asymptomatic screening. Conventional and digital mammography have also proven effective for diagnostic procedures after the identification of a possible abnormality by screening mammogram or clinical breast exam. However more than 10% of screening marmograms result in a recommendation for further diagnostic procedures, including repeat standard mammography, sonography, biopsy, and needle aspiration. Furthermore, the actual rate of malignancy in masses referred for surgical biopsy is less than 25%. These factors, among others, have created interest in developing alternative screening and diagnostic modalities.

Of particular interest are tomagraphic modalities, i.e. those modalities which capture a series of projections and do a series of reconstructions on the data. Unlike conventional modalities, the wide range of data captured by the tomagraphic modalities allow for analysis of the data in various dimensions such as in a two-dimensional image slice or in a three-dimensional volume set or rendering of the imaged object. Examples of tomographic modalities include, but are not limited to, computed tomography (CT), positron emission tomography (PET), nuclear medicine imaging, thermoacoustic tomography (TCT), electrical impedance tomography (EIT), and near infrared optical tomography. (NR).

Of the tomographic modalities, CT is the most prevalent and most fully developed. The CT modality, however, has historically been rejected for mammography due to radiation dose inefficiency resulting from the configuration of current scanners. In particular, current CT scanners acquire images transverse to the breast and require higher X-ray exposure to penetrate the entire thoracic cavity, thereby exposing significant amounts of non-breast tissue to radiation. Techniques which overcome these undesired consequences of CT are therefore desirable. Likewise, the continued development of other tomographic mammography techniques is also desired.

As interest in alternate screening and diagnostic breast imaging modalities increases, it is also desirable to develop computer assisted detection and diagnosis (CAD) algorithms to supplement and assist radiologist review of the mammographic images. CAD is typically based upon various types of analysis of a series of collected images in which the collected images are analyzed in view of the pathologies that are highlighted by the CAD algorithm. While CAD has been proposed for X-ray mammography, magnetic resonance imaging and ultrasound, it has not been considered as a potential tool in tomographic breast imaging modalities as such modalities have not been aggressively developed. However, the development of CAD in the tomographic modalities associated with mammography is desirable because CAD provides valuable assistance and time-savings to the reviewing radiologist. In particular, the increased quantity of data acquired in a tomographic acquisition make the time-savings and assistance provided by CAD even more important in tomographic imaging than in conventional projection imaging. In addition, due to the nature of tomographic data, CAD presents novel opportunities for utilizing information from Radon-space data, reconstructed two-dimensional slice data, and reconstructed three-Dimensional volume data. The present technique is directed to one or more of these problems.

BRIEF DESCRIPTION OF THE INVENTION

The present technique provides a novel method and apparatus using CAD to detect and diagnose abnormal structures observed using tomographic marrrnography techniques. Particularly, the technique provides a method and system for processing a tomographic mammogramn generated by a tomographic imaging system. The technique utilizes CAD to assist in the detection and/or diagnosis of abnormal structures within the tomographic mammogram.

In accordance with one aspect of the technique, a method is provided for analyzing mammography data acquired by a tomographic system. The method includes acquiring a tomographic data set from a tomographic mammography system. The tomographic data set is segmented into one or more segmented data sets. One or more features of the one or more segmented data sets are processed to produce one or more feature-processed data sets. The one or more feature-processed data sets are then provided to a reviewer.

The technique also provides a method for analyzing tomographic data in Radon space. The method includes acquiring a tomographic projection data set from a tomographic imaging system. A feature of interest is identified in the tomographic projection data set. A reconstructed data set derived from the tomographic projection data is processed based upon the feature of interest such that the feature of interest is enhanced in the reconstructed data set.

Furthermore, the technique provides a method for analyzing tomographic data. The method includes analyzing a tomographic data set via a first processing path and identifying a feature of interest within the tomographic data set. A related tomographic data set is processed via a second processing path based upon the feature of interest.

The technique also provides a tomographic mammography system that includes a tomographic scanner generally comprising a source and a detector. A computer system is operably coupled to the tomographic scanner via a system controller and operably coupled to a memory element, an operator workstation, and one or more output devices. The computer system is configured to acquire a tomographic data set from the tomographic scanner and segment the tomographic data set into one or more segmented data sets. The computer system is further configured to process one or more features of the one or more segmented data sets to produce one or more feature-processed data sets, and provide the one or more feature-processed data sets to reviewer.

The technique also provides a tomographic imaging system that includes a tomographic scanner generally comprising a source and a detector. A computer system is operably coupled to the tomographic scanner via a system controller and operably coupled to a memory element, an operator workstation, and one or more output devices. The computer system is configured to analyze a tomographic data set via a first processing path, identify a feature of interest within the tomographic data set; and process a related tomographic data set via a second processing path based upon the feature of interest.

Furthermore the technique provides a tomographic mammography system that includes a means for acquiring a tomographic image data set. The tomographic mammography system also includes a means for segmenting the tomographic image data set into one or more segmented data sets and a means for processing one or more features of the one or more segmented data sets to produce one or more feature-processed data sets. In addition, the tomographic mammography system includes a means for providing the one or more feature-processed data sets to reviewer.

The technique furthermore provides a tangible medium for analyzing mammography data acquired by a tomographic system. Code stored on the tangible medium includes a routine for acquiring a tomographic data set from a tomographic mammography system. Routines are also provided for segmenting the tomographic data set into one or more segmented data sets and for processing one or more features of the one or more segmented data sets to produce one or more feature-processed data set. A further routine is provided for providing the one or more feature-processed data sets to a reviewer.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
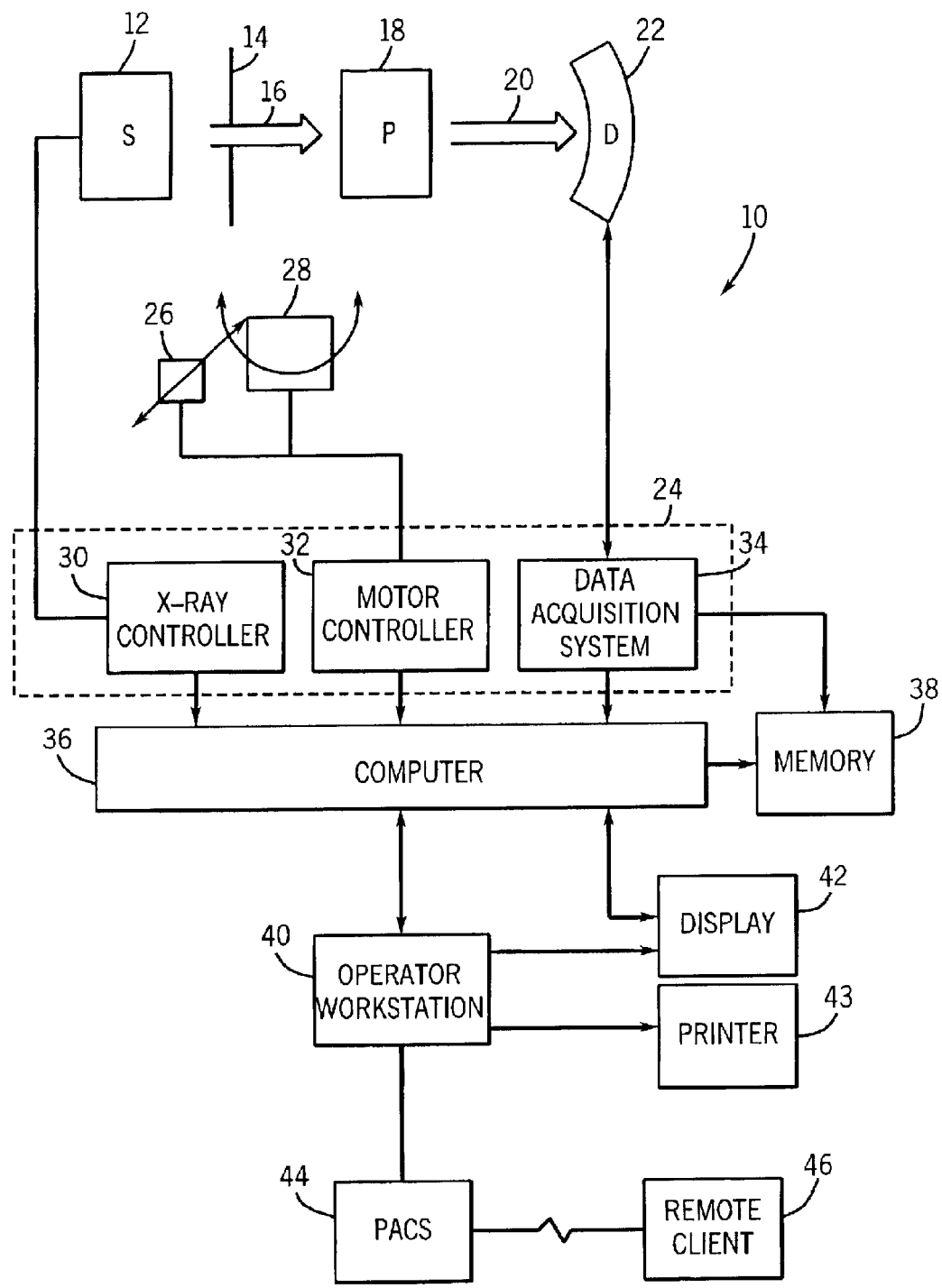
FIG. 1 is a diagrammatical view of an exemplary imaging system in the form of a CT imaging system for use in producing processed images in accordance with aspects of the present technique.

FIG. 1 illustrates diagrammatically a mammography imaging system 10 for acquiring and processing tomographic image data. In the illustrated embodiment, system 10 is a computed tomography (CT) system designed both to acquire original image data, and to process the image data for display and analysis in accordance with the present technique. Alternative embodiments of system 10 can include a positron emission tomography (PET) mammography system, a nuclear medicine breast imaging system (scintimammography), a thermoacoustic tomographic breast imaging system (TCT), an electrical impedance mammography system (EIT), near-infrared mammography systems (NIR), and X-ray tomosynthesis mammography systems (XR).

In the CT embodiment illustrated in FIG. 1, imaging system 10 includes a source of X-ray radiation 12 positioned adjacent to a collimator 14. In this exemplary embodiment, the source of X-ray radiation source 12 is typically an X-ray tube. Other modalities, however, possess different sources of imaging energy or radiation. For instance, modalities such as PET and nuclear medicine imaging utilize an injectable radionucleotide as a source 12, and source 12 encompasses such alternative sources of imaging energy or radiation which are utilized in tomographic imaging systems.

Returning to the CT embodiment of FIG. 1, the collimator 14 permits a stream of radiation 16 to pass into a region in which a subject, such as a human patient 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

Source 12 is controlled by a system controller 24 which furnishes both power and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a linear positioning subsystem 26 and rotational subsystem 28. The rotational subsystem 28 enables the X-ray source 12, collimator 14 and the detector 22 to be rotated one or multiple turns around the region to be imaged. It should be noted that the rotational subsystem 28 may include a gantry suitably configured to receive the region to be imaged, such as a human breast in a CT mammography system. Thus, the system controller 24 may be utilized to operate the gantry. The linear positioning subsystem 26 enables the region to be imaged to be displaced linearly, allowing images to be generated of particular areas of the patient 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. In alternative embodiments, the source 12, detector array 22, and X-ray controller 30 comprise suitable analogs. A motor controller 32 may be utilized to control the movement of the rotational subsystem 28 and the linear positioning subsystem 26.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and coverts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory to store a large amount of data may be utilized by such an exemplary system 10. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed on to a printer 43 which may be coupled to the computer 36 and the operator workstation 40. Further, the operator workstation 40 may also be coupled to a picture archiving and communications system (PACS) 44. It should be noted that PACS 44 may be coupled to a remote system 46, radiology department information system (RIS), hospital information system (HIS) or to an internal or external network, so that others at different locations may gain access to the image and to the image data.

It should be further noted that the computer 36 and operator workstation 46 may be coupled to other output devices which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or, in an entirely different location, linked to the image acquisition system via one or more configurable networks, such as the Internet, virtual private networks, and so forth.

Figure 2:
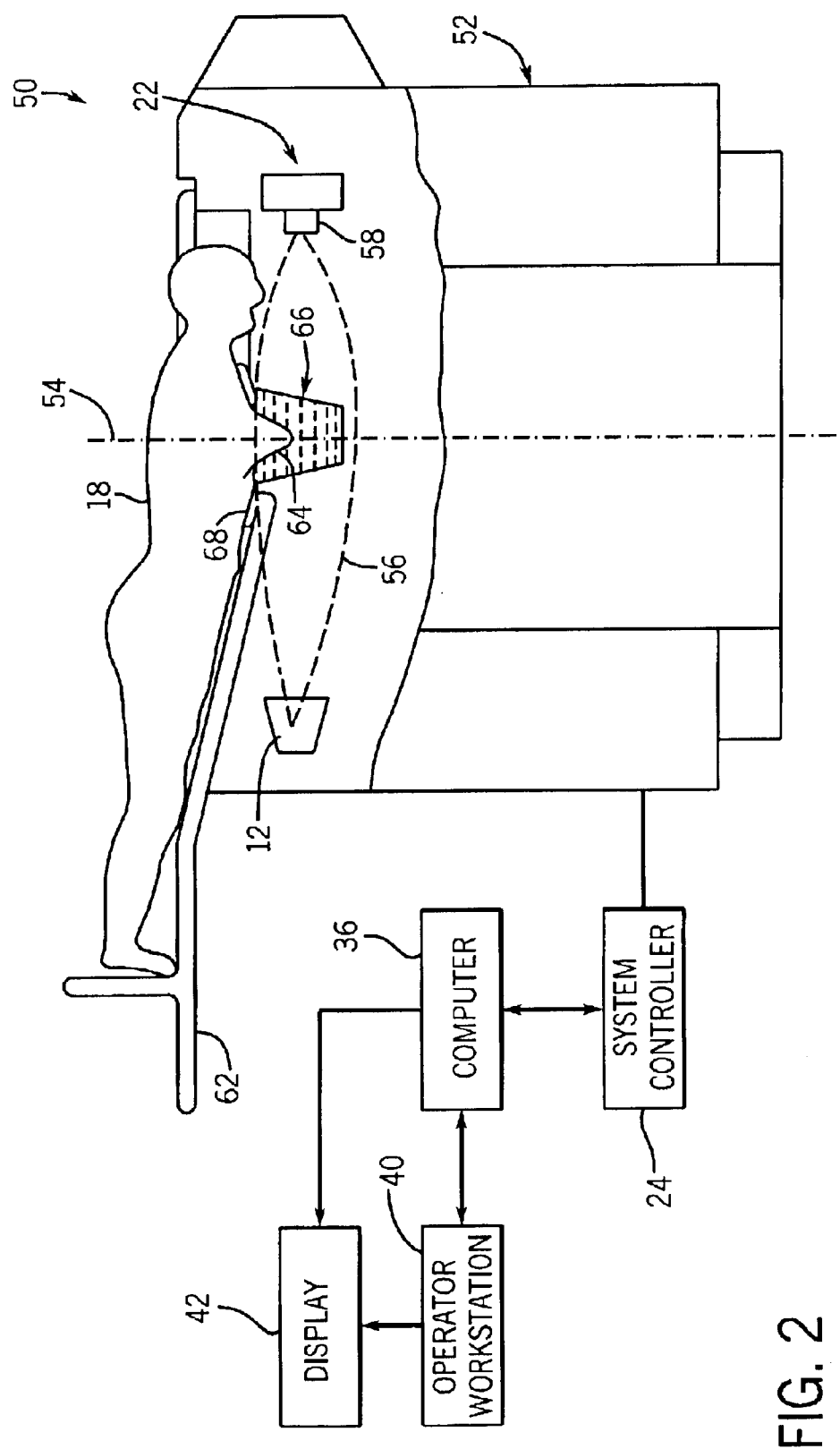
FIG. 2 is a diagrammatical view of a physical implementation of a CT mammography system of FIG. 1.

Referring generally to FIG. 2, an exemplary imaging system utilized in the present embodiment is depicted, as CT mammography system 50. FIG. 2 demonstrates a dedicated CT mammography geometry in which the image acquisition occurs while the woman lies prone on an examination table while with her breast hanging through a hole in the pendulant position. In this configuration, the CT mammography system 50 acquires images created in the coronal plane of the breast with the X-ray tube and detector rotating around the breast in the horizontal plane. This CT mammography configuration thereby prevents unnecessary radiation exposure to the surrounding tissue.

In particular, the CT scanning system 50 is illustrated with a frame 52 encompassing a rotational axis 54. The rotational axis 54 lies within the rotational circuit 56 defined by the diametrically opposed source 12 and detector array 22 which are mounted upon a rotatable scan arm or rotor which comprises a portion of the rotational subsystem 28. The detector array 22 consists of numerous detectors 58 arcuately arranged upon the array 22. In a typical embodiment, the rotational axis 54 is substantially coincident with the center of the image field. As illustrated in FIG. 2, the source 12 and detector array 24 are not necessarily equidistant from the rotational axis 54.

In the depicted embodiment, the patient 18 lies face down on a patient table 62. In this position, a breast 64 of the patient 18 is disposed pendulantly in the imaging volume 66 for examination purposes. The body around the breast is supported on an apertured surface 68.

In typical operation, X-ray source 12 projects an X-ray beam from a focal point toward detector array 22. The detector 22 is generally formed by a plurality of detector elements 58 which sense the X-rays that pass through and around the imaged area. Each detector element 58; produces an electrical signal that represents the intensity of the X-ray beam at the position of the element at the time the beam strikes the detector 58. Furthermore, the source 12 and detector array 22 are rotated around the imaged region so that a plurality of radiographic views may be collected by the computer 36 via the system controller 24 and data acquisition system 34. Thus, an image or slice is acquired which may incorporate, in certain modes, less or more than 360 degrees of projection, to formulate an image. The source 12 and the detector 22, in addition to rotating about the imaged region, can be linearly displaced utilizing the linear positioning subsystem 26 to image different horizontal planes of the imaged region, i.e. the breast 64. The image is collimated to a desired thickness using either lead shutters in front of the X-ray source 12 and different detector apertures 22. The collimator 14 (see FIG. 1) typically defines the size and shape of the X-ray beam that emerges from the X-ray source 12.

Alternately, a volume CT (VCT) imaging geometry may be employed in this configuration. If a VCT imaging geometry is present, all of the horizontal planes are acquired concurrently, i.e., the source 12 and the detector 22 are configured such that the entire imaging volume 66 is imaged instantaneously. The linear positioning subsystem 26 is typically absent from such a VCT imaging configuration. VCT projection data acquired in such a VCT system resembles traditional X-ray data taken at all angles and may be acquired and analyzed in VCT mammography systems.

Thus, as the X-ray source 12 and the detector 22 rotate, the detector 22 collects data of the attenuated X-ray beams. Data collected from the detector 22 then undergoes pre-processing and calibration to condition the data to represent the line integrals of the attenuation coefficients of the scanned objects. The processed data, commonly called projections, are then filtered and backprojected to formulate an image of the scanned area. As mentioned above, the computer 36 is typically used to control the entire CT system 10. The main computer that controls the operation of the system may be adapted to control features enabled by the system controller 24. Further, the operator workstation 40 is coupled to the computer 36 as well as to a display, so that the reconstructed image may be viewed.

Once reconstructed, the image produced by the system of FIGS. 1 and 2 reveals internal features of the breast 64 of the patient 18. The image may be displayed to show these features. In traditional approaches to diagnosis of medical conditions, such as disease states, and more generally of medical events, a radiologist or physician would consider a hard copy of display of the image 64 to discern characteristic features of interest. Such features might include lesions, masses, microcalcifications, and other features which would be discernable in the image based upon the skill and knowledge of the individual practitioner.

The present technique implements certain of these capabilities by CAD algorithms. As will be appreciated by those skilled in the art, CAD algorithms may offer the potential for identifying, or at least localizing, certain features of interest, such as anatomical anomalies and differentially processing such features. The particular CAD algorithm is commonly selected based upon the type of feature to be identified, and upon the tomographic imaging modality used to create the image data. The CAD technique may employ segmentation algorithms, which identify the features of interest by reference to known or anticipated image characteristics, such as edges, identifiable structures, boundaries, changes or transitions in colors or intensities, changes or transitions in spectrographic information, and so forth. The CAD algorithm may facilitate detection alone or may also facilitate diagnosis. Subsequent processing and data acquisition is, then, entirely at the discretion and based upon the expertise of the practitioner.

Figure 3:
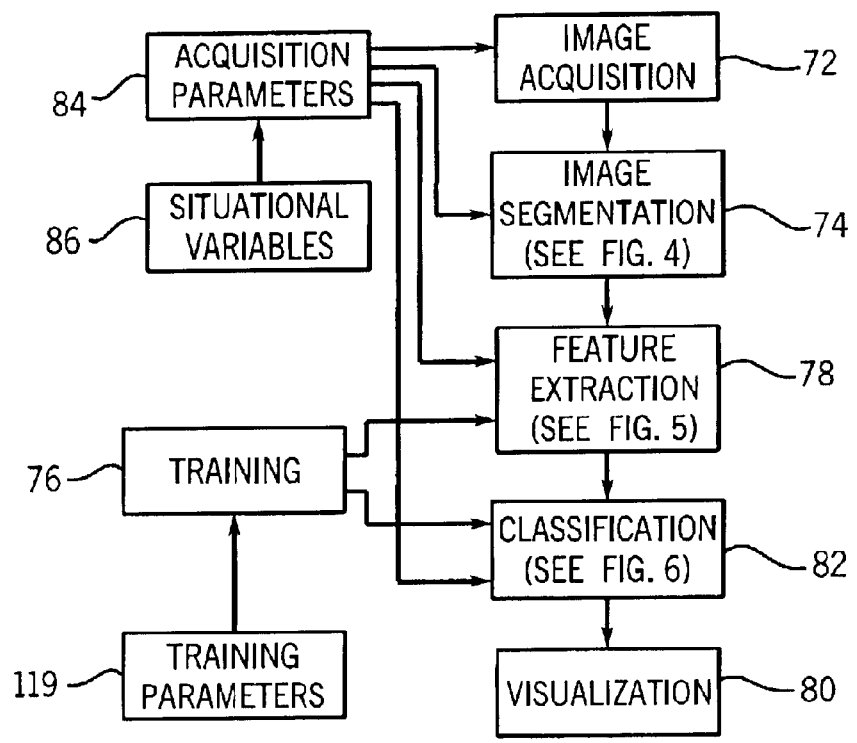
FIG. 3 is a flow chart illustrating exemplary steps for carrying out CAD processing of tomographic mammography data.

CAD algorithms may he considered as including several parts or modules, all of which may be implemented in the present technique as depicted in FIG. 3. After tomographic image acquisition, as depicted as block 72, the CAD algorithm may be automatically implemented to process the acquired tomographic image data set. In general, the CAD algorithm may include various modules or subroutines. These modules may include accessing the tomographic image data set, segmenting data or images (block 74), training (block 76), feature selection or extraction (block 78), and visualization (block 80). Additional modules of the CAD algorithm may include classification (block 82). Moreover, the CAD processing may be performed on an acquisition projection data set prior to reconstruction, on two-dimensional reconstructed data (both in axial and scout modes), on three-dimensional reconstructed data (volume data or multiplanar reformats), or a suitable combination of such formats. The acquired projection data set may have a number of one-dimensional projections for two-dimensional scans or a number of two-dimensional projections for three-dimensional scans.

Using the acquired or reconstructed data, segmentation 74, feature selection 78, and classification 82 may be performed prior to visualization 80. These basic processes can be done in parallel, or in various combinations. In addition to the various CAD modules depicted in FIG. 3, other processes may be present in the present technique which affect the overall process. For instance, acquisition parameters 84 may be provided by an operator or in an automated manner which affect the tomographic image date acquisition 72. Such acquisition parameters 84 may affect the set of tomographic data acquired and thereby influence the outcome of the CAD processes employed. Similarly, various situational variables 86, such as patient history, known physiological traits, equipment specific issues, or patient sensitivities and temperament may contribute to the selection of acquisition parameters 84.

The acquired projection dataset can have a number of one-dimensional projections for two-dimensional scans or a number of two-dimensional projections for three-dimensional scans. The tomographic data set on which the CAD algorithm is implemented may be the raw image acquisition data or may be partially or completely processed data. For example, the data may originate from a tomographic data source, such as image acquisition data in projection or Radon domain in CT imaging, may be diagnostic tomographic data, such as single or multiple reconstructed two-dimensional images or three-dimensional reconstructed volumetric image data, or may be a suitable combination of raw or reconstructed data.

Figure 4:
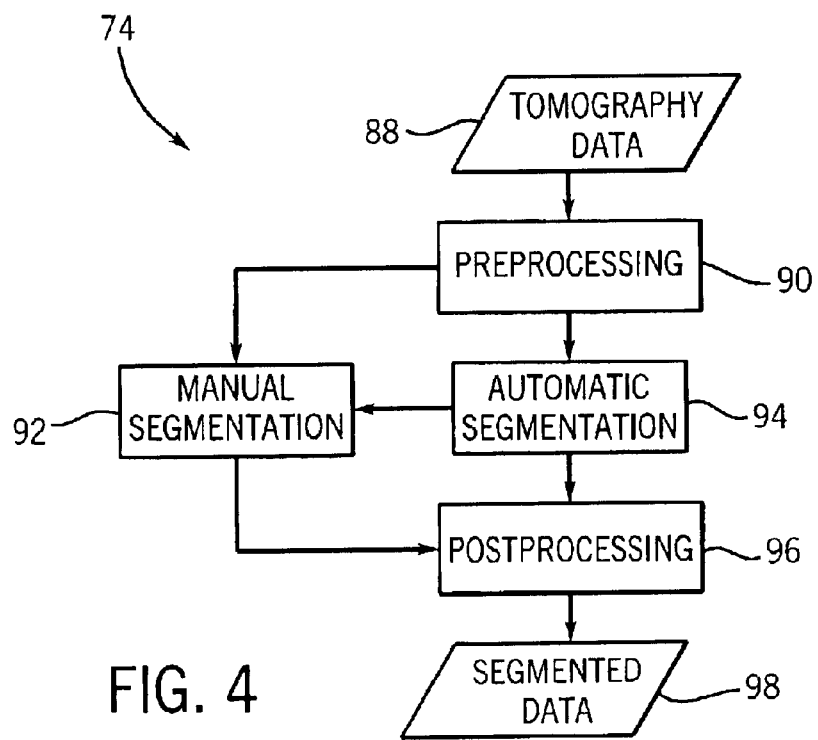
FIG. 4 is a flow chart illustrating exemplary steps of a segmentation process executed by a CAD process.

The segmentation portion 74 of the CAD algorithm, depicted in greater detail in FIG. 4, may identify a particular region of interest based upon calculated features in all or part of the tomographic data set 88. Prior to identifying the region of interest, the tomographic data 88 may be pre-processed, as depicted at block 90. Preprocessing 90 may include various data manipulations such as dynamic range adjustment, contrast enhancement, noise reduction, smoothing, sharpening and other types of filtering (e.g. low pass, high pass, band pass).

After pre-processing 90, the region of interest can be determined in a number of manners, using an entire data set or using part of a data set, such as a candidate mass region, a stellate lesion, or a micro-calcification. The particular segmentation technique may depend upon the anatomies to be identified, and may typically be based upon iterative thresholding, K-means segmentation, edge detection, edge linking, curve fitting, curve smoothing, two- and three-dimensional morphological filtering, region growing, fuzzy clustering, image/volume measurements, heuristics, knowledge-based rules, decision trees, neural networks, and so forth. The segmentation may be manual, as depicted at block 92, allowing an operator to utilize a selection mechanism and the displayed image to select one or more portions of the image for differential processing. Automated segmentation 94 may also be employed, using prior knowledge such as shape and size of a mass to automatically delineate an area of interest. A combination of the manual and automated methods may also be performed to allow a semi-automated method of segmentation.

In the event that a combination of automated and manual methods are employed, a post-processing step 98 may be performed. Post-processing 98 may include various combinatorial techniques for coordinating the results of the manual and automated segmentation processes. These combinatorial techniques may include manual adjustment of control points resulting from the automatic segmentation process, such as for threshold adjustment, contour adjustment, and other fine tuning steps. A segmented data set 98 results from the segmentation process 92, 94 and the optional post-processing process.

Referring once again to FIG. 3, the segmented data set 98 undergoes feature extraction 78, described in greater detail by reference to FIG. 5. The feature extraction 78 aspect of the CAD algorithm involves performing computations on the data which comprises the desired images. Multiple feature measures can be extracted from the image-based data using region of interest statistics, such as shape, size, density, and curvature. For projection space data, features such as location, shape, or size of feature projections in a view or location may be used, such as to provide consistency between views. For non acquisition-based or patient-based data 99, such as patient history, the data themselves may serve as the features.

Figure 5:
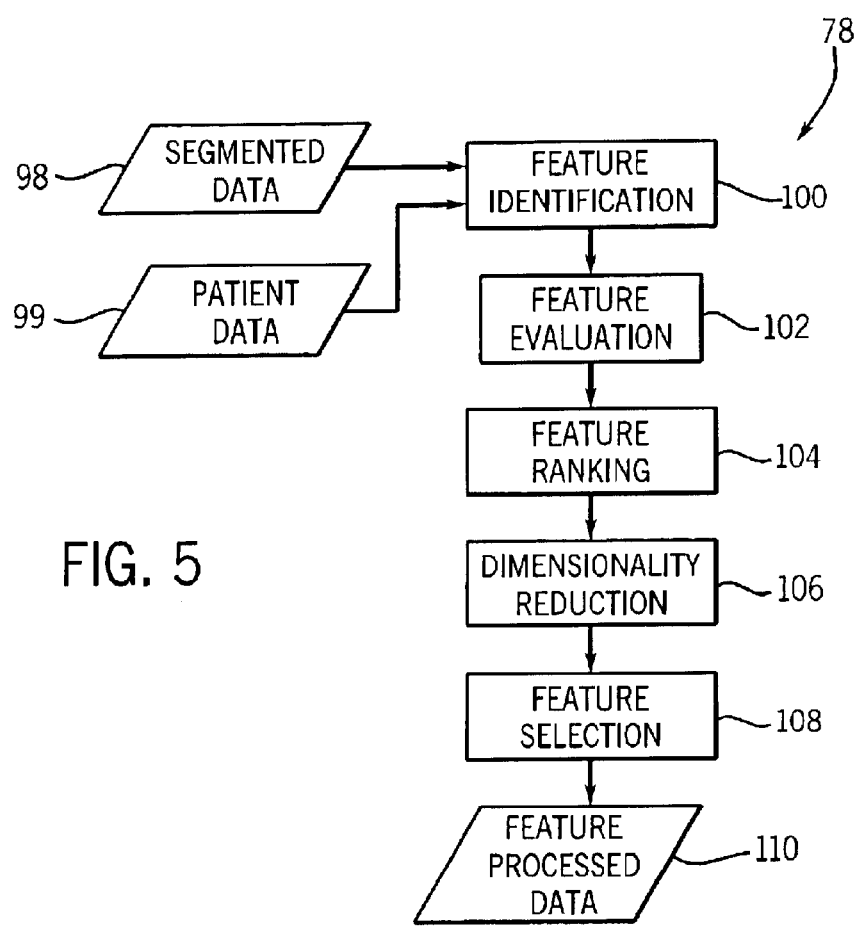
FIG. 5 is a flow chart illustrating exemplary steps of a feature extraction process executed by a CAD process.

For example, as depicted in FIG. 5, typical processes associated with CAD algorithms may include feature identification 100 of the segmented data set 98. The feature identification process 100 processes the segmented data 98 for multiple measures indicative of features of interest, such as shape, size, texture, intensity, radiographic density, gradient, edge strength, location, proximity, histogram, symmetry, eccentricity, orientation, boundaries, moments, fractal dimensions, entropy, etc. The feature identification process 100 may also process the patient data 99 for information related to patient history, such as age, smoking, family history, pregnancy history, weight, BIRAD classification, genetic or proteomic profile, hormonal status, etc., for factors which may weight aspects of the feature identification process 100, such as by adjusting threshold values or weighting factors.

The feature selected data may then undergoes a feature evaluation process 102 whereby the CAD algorithm evaluates the selected features according to their separability into different classification groups based upon a distance criteria. Examples of suitable distance criteria include divergence, Bhattacharya distance, and Mahalanobis distance though those skilled in the art will be familiar with other possible distance criteria. The evaluated features in the data set may then undergo a feature ranking process 104 whereby the evaluated features are ranked in accordance with the applicable distance criteria.

Subsequent to the feature ranking process 104, the data set may be processed to eliminate correlated features by a dimensionality reduction process 106. In this manner, a large number of identified features may be reduced to a smaller number by eliminating those features deemed to be highly correlated with other features present in the data set. In this manner, duplicative analysis may be minimized and the feature set may be reduced to a manageable number for subsequent review by a diagnostician or subsequent automated processes.

After correlated features have been eliminated, a feature selection process 108 is applied to the remaining feature. A typical feature selection process 108 may consist of creating a selected feature set beginning with a highest ranked feature, from ranking process 104, and adding features to the set based upon descending rank. When performance of the feature set, as determined by some optimizing criteria or algorithm, is no longer improved by the addition of features, the feature set is determined and additional features are not added to the set.

The product of some or all of the foregoing feature extraction processes is a feature-processed data set 110 which, referring to FIG. 3, may then undergo visualization 80. The visualization process 80 of the CAD algorithm permits reconstruction of useful images for review by human or machine observers. Thus, various types of images may be presented to the attending physician or to any other person needing such information, based upon any or all of the processing and modules performed by the CAD algorithm. Because the CAD process may be applied to all or part of the tomographic data set 88 in a differential manner, the results may be displayed separately or may be synthesized for display as a single image. Such a single image synthesis improves the benefits obtained from CAD by simplifying the segmentation process while not increasing the quantity or complexity of data to be reviewed.

The visualization 80 may include two -or three-dimensional renderings, superposition of feature markers, color or intensity variations, and so forth. A superposed marker may convey information, such as a feature classification, a probability associated with a classification, or three-dimensional location information of the feature, without obscuring the reconstructed anatomic data. In addition, while a marker may consist of a displayed pointer or text, it may also include a color-coded overlay, a color or intensity variation, or any other addition that is recognized and understood by the operator. Typically, CAD provides the ability to display such markers on any of the multiple data. This allows the reviewer to view only a single data or image upon which the results from an array of CAD operations, such as different levels or types of segmentation, feature extraction or classification processes, may be superimposed. In such cases, the markers may be differentiated, such as by color or shape, to allow the reviewer to determine which operation produced the marker.

Figure 6:
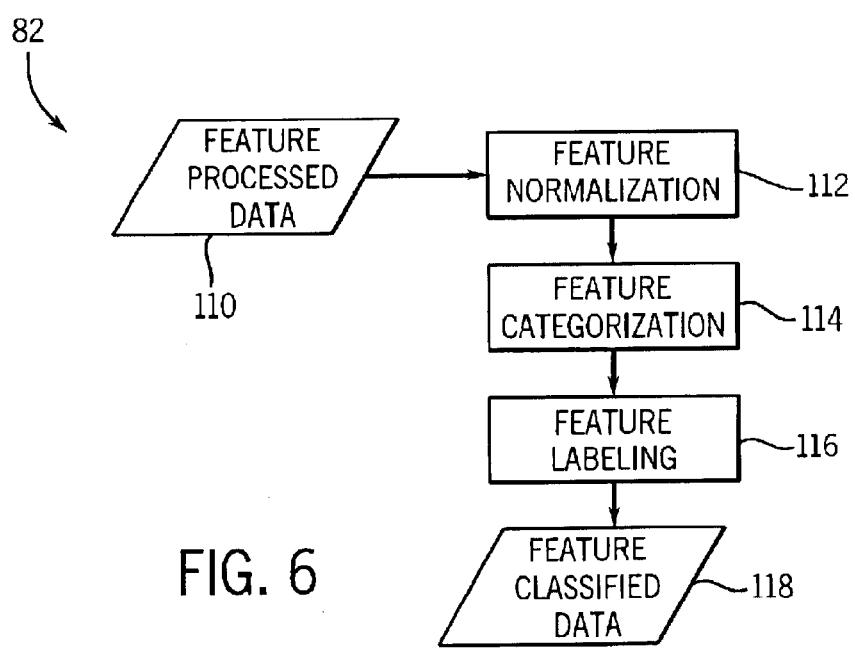
FIG. 6 is a flow chart illustrating exemplary steps of a feature classification process executed by a CAD process.

In addition to the feature localization steps described above, feature diagnosis may also be performed as part of the CAD algorithm by means of an optional feature classification process 82, as depicted in FIG. 3 and in greater detail in FIG. 6. The feature classification process 82 may categorizes the selected features of the tomographic data set into normal and abnormal lesions. The classification aspects of the CAD algorithm may be, again, partially or fully manual or automated. In particular, the classification algorithm may be used to specifically identify regions of interest, such as by classification as normal or abnormal anatomies or lesions. Bayesian classifiers, neural networks, rule-based methods or fuzzy logic techniques, among others, can be used for classification. It should be noted that more than one CAD algorithm can be employed in parallel. Such parallel operation may involve performing CAD operations individually on portions of the image data, and combining the results of all CAD operations (logically by "and", "or" operations or both). In addition, CAD operations to detect multiple disease states or anatomical features of interest may be performed in series or in parallel.

Referring now to FIG. 6, one or more processes which may comprise part of the feature classification process 82 are depicted. Initially, the feature-processed data 110 resulting from the feature extraction process 78 undergoes feature normalization 112. The feature normalization process 112 normalizes the features measures with respect to measures derived from a database of known normal and abnormal case if interest. The training process 76 may be utilized to train the feature normalization process 112 to enhance the classification process based upon prior knowledge and experiences.

The normalized feature data then undergoes feature categorization 114 whereby the features are grouped or clustered based upon their respective normalized feature measures. The grouping may be implemented by various methods including decision tree analysis, discriminant function analysis, Bayes' minimum-risk method, clustering techniques, similarity measure approach, etc. The clustered features are then labeled, by the insertion of markers in the code, by the feature labeling process 116. The result of the feature classification process 82 is a feature classified data set 118 which may then undergo visualization 80 for review.

Both the feature extraction process 78 and feature classification 82 processes discussed above may be modified or enhanced by a training process 76, as depicted in FIG. 3. The training process 76 utilizes many of the processes of the feature extraction process 78 to process known samples of normal and abnormal lesions. The training process 76 thereby incorporates prior knowledge into the feature extraction process 78. The prior knowledge available to the training process 76 may be provided in the form of training parameters 119 which may include, but are not limited to, expert input, acquisition parameters 84, situational variables 86, and alternative procedure results, e.g., biopsy.

For example, the training process 76 may compute several candidate features from known samples of normal and abnormal lesions. A feature selection algorithm may then be employed to discard those candidate features which provide no useful information or which provide redundant information, retaining only the useful candidate features. The decision to retain or discard a candidate feature is based upon classification results with different combinations of candidate features. Reduction of the dimensionality of the data set, i.e. discarding redundant candidate features, has the practical benefit of improving computational time and reducing overhead associated with storage and data transmission. The derived feature set is based on the optimal discrimination between normal and abnormal lesions using one or more of the distance criteria discussed above in regard to feature evaluation 102 and feature ranking 104. This optimal feature set can then be extracted on the regions of interest in the CAD system to enhance the feature extraction process 78.

Figure 7:
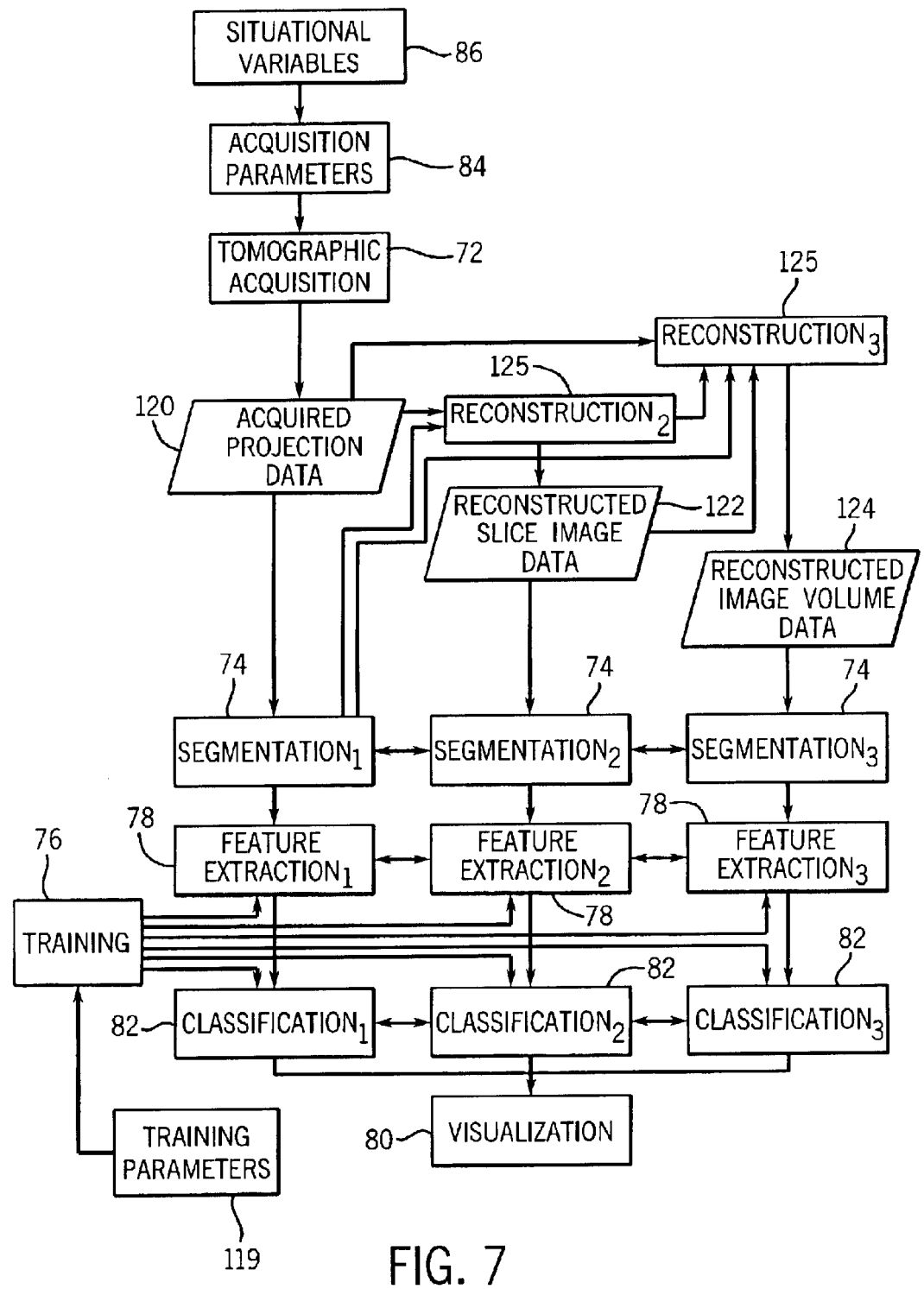
FIG. 7 is a flow chart illustrating the parallel processing of acquired and reconstructed tomographic data by a CAD process.

As noted above, the CAD processing may be performed on an acquisition projection data set prior to reconstruction, on two-dimensional reconstructed data, on three-dimensional reconstructed data, or a suitable combination of such formats. The processing may also be performed in parallel such that the various parallel paths may interact with or influence one another. For instance, as depicted in FIG. 7, separate CAD processing paths may be performed in parallel upon the acquired projection data 120, the reconstructed slice image data 122, and the reconstructed image volume data 124 produced by a typical CT embodiment of the technique. Information obtained by the segmentation 74 of the acquired projection data 120 may be utilized in the reconstruction processes 125 which reconstruct the slice image data 122 or the image volume data 124 or may impact the segmentation 74 of these respective data sets 122, 124. Information obtained from the segmentation of the reconstructed slice image data 122 may impact the reconstructed image volume data 124 or the segmentation 74 of the acquired projection data 120 or the reconstructed image volume data 124. Likewise the segmentation of the reconstructed image volume data 124 may have similar consequences in the parallel paths. Additionally the feature extraction 78 and the feature classification 82 of any of the parallel processing paths may impact or influence either of the remaining paths.

Figure 8:
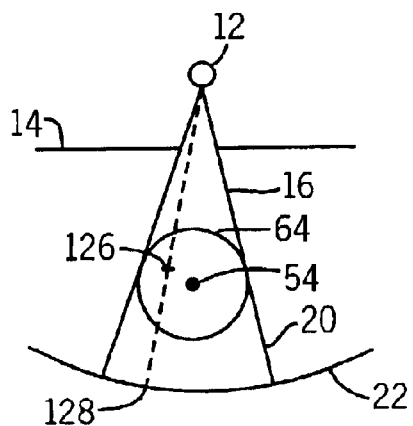
FIG. 8 is a diagrammatical view of a tomographic image acquisition by a CT mammography system.
Figure 9:
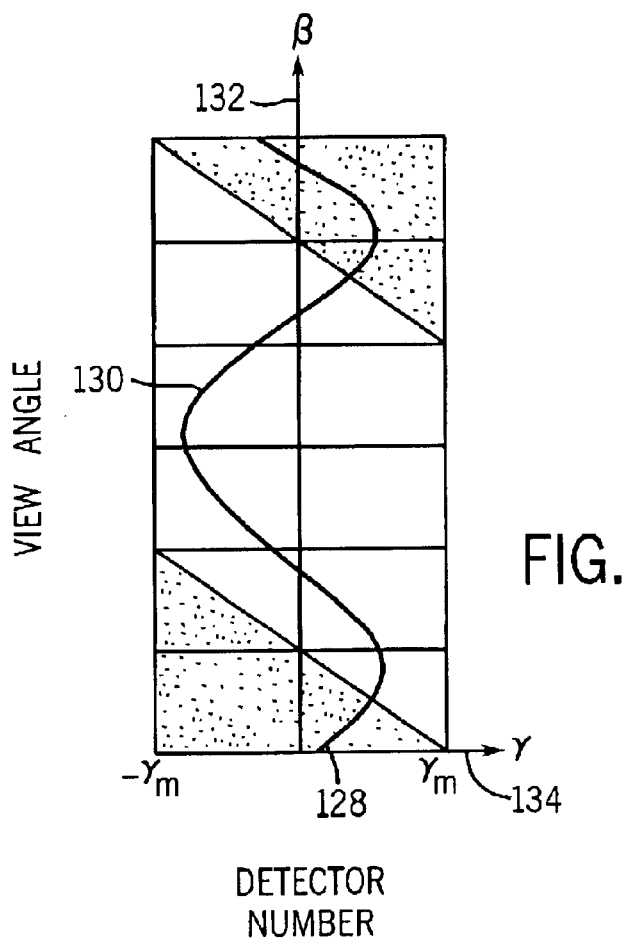
FIG. 9 depicts CT acquired projection data in the form a sinusoidal trace caused by a scanned abnormality.

For example, as depicted in FIG. 8, acquired projection data 120 may be obtained by measuring the pass-through radiation 20 which a breast 64 allows through as measured by detector array 22. A feature 126, such as a microcalcification, within the breast 64 differentially affects the pass-through radiation 20 measured at pixel location 128. As the source 12 and detector array 22 rotate about the rotational axis 54, the feature 126, as measured by pixel location 128, will form a sinusoidal trace 130 in Radon space as plotted on FIG. 9 utilizing a vertical axis 132 representative of view angle and a horizontal axis 134 representative of detector number, from −m to m.

The presence of such a sinusoidal trace 130 can be utilized in segmenting the acquired projection data 120 but can also enhance or improve the segmentation of the feature in the reconstructed slice image data, and thereby to the reconstructed volume image data as well.

Figure 10:
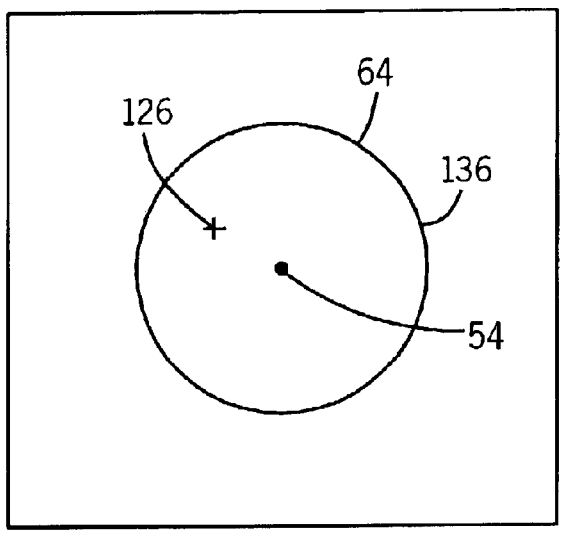
FIG. 10 depicts two-dimensional slice data reconstructed from the projection data of FIG. 9.
Figure 11:
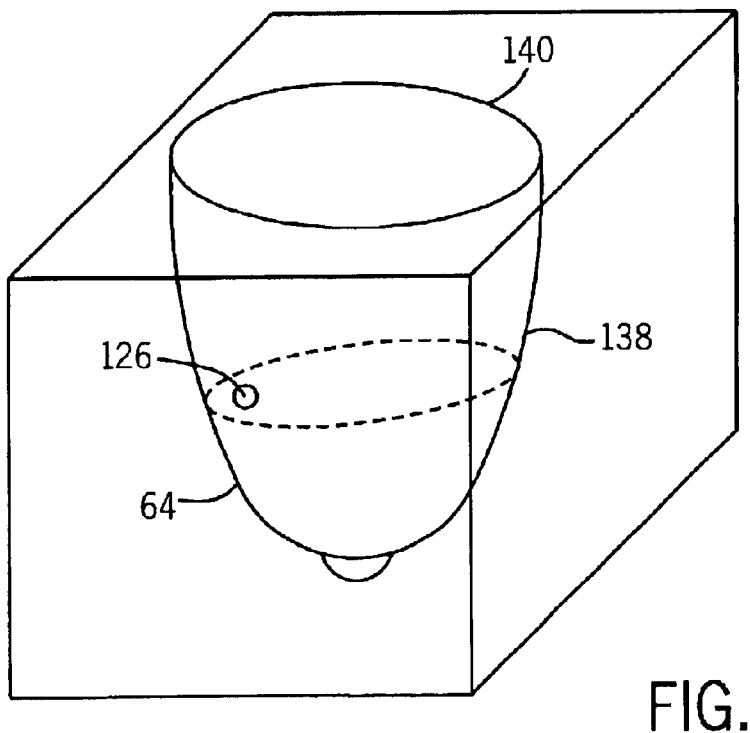
FIG. 11 depicts a three dimensional rendering reconstructed from the projection data of FIG. 9.

Thus, the identification of the sinusoidal trace 130 may allow for differential processing of the reconstructed slice image data, represented as slice reconstruction 136 in FIG. 10 or of the three-dimensional rendering 138 of a breast 64 and chest wall 140 in FIG. 11. In particular, identification of the sinusoidal trace 130 in the acquired projection data processing path may enhance the segmentation algorithm 74, feature extraction algorithm 78, or classification algorithms 82 in the remaining paths such that they are more sensitive to locating, extracting, or classifying feature 126 by their respective processes. Similarly, features 126 that are more readily identifiable in the reconstructed slice image data 122 or the reconstructed image volume data 124 may serve to enhance the sensitivity of the segmentation, extraction, or classification processes of the remaining processing paths. In this manner, full advantage can be taken of the acquired tomographic data.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for analyzing mammography data acquired by a tomographic system, comprising:

acquiring a tomographic data set from a tomographic mammography system;

segmenting the tomographic data set into one or more segmented data sets;

processing one or more features of the one or more segmented data sets to produce one or more feature-processed data sets; and providing the one or more feature-processed data sets to a reviewer.

2. The method as recited in claim 1, wherein acquiring the tomographic data set comprises acquiring the tomographic data set from a computed tomography mammography system.

3. The method as recited in claim 1, wherein acquiring the tomographic data set comprises acquiring the tomographic data set from a PET mammography system.

4. The method as recited in claim 1, wherein acquiring the tomographic data set comprises acquiring the tomographic data set from a thermoacoustic mammography system.

5. The method as recited in claim 1, wherein acquiring the tomographic data set comprises acquiring the tomographic data set from a nuclear medicine breast imaging system.

6. The method as recited in claim 1, wherein acquiring the tomographic data set comprises acquiring the tomographic data set from an electrical impedance mammography system.

7. The method as recited in claim 1, wherein acquiring the tomographic data set comprises acquiring the tomographic data set from a near-infrared mammography system.

8. The method as recited in claim 1, wherein acquiring the tomographic data set comprises acquiring the tomographic data set from an X-ray tomosynthesis mammography system.

9. The method as recited in claim 1, wherein segmenting the tomographic data comprises segmenting the tomographic data based upon the manual delineation of one or more regions by an operator.

10. The method as recited in claim 1, wherein segmenting the tomographic data comprises segmenting the tomographic data based upon the automated delineation of one or more regions by an automated algorithm.

11. The method as recited in claim 1, wherein processing one or more features of the one or more segmented data sets comprises extracting one or more features from the one or more segmented data sets.

12. The method as recited in claim 11, wherein processing one or more features of the one or more segmented data sets further comprises at least one of evaluating the one or more features using a distance criteria, ranking the features based upon the distance criteria, eliminating one or more features based upon a degree of correlation, and optimizing a selected feature set using a performance algorithm to produce the one or more feature-processed data sets.

13. The method as recited in claim 11, further comprising training a processing system to process the one or more features of the one or more segmented data sets.

14. The method as recited in claim 1, further comprising classifying each of the one or more features of the one or more feature-processed data sets based upon one or more feature measurements of each feature to produce the one or more feature-processed data sets.

15. The method as recited in claim 14, wherein classifying the one or more features comprises normalizing the feature measurements based upon two or more prior measurements of known normal and abnormal features, grouping the one or more features based upon their normalized feature measurements, and labeling the groups of one or more features.

16. The method as recited in claim 15, wherein at least one of grouping the one or more features and labeling the groups is performed by an automated algorithm utilizing one or more stored data sets.

17. The method as recited in claim 1, wherein providing the one or more feature-processed data sets to the reviewer comprises displaying the one or more feature-processed data sets to an operator for review.

18. The method as recited in claim 1, wherein providing the one or more feature-processed data sets to the reviewer comprises providing the one or more feature-processed data sets to a subsequent automated process for at least one of further processing and analysis.

19. The method as recited in claim 1, wherein providing the one or more feature-processed data sets to the reviewer comprises superposing one or more markers on the feature-processed data sets.

20. The method as recited in claim 19, wherein the one or more markers convey at least one of a feature classification, a classification probability, and a three-dimensional location.

21. A method for analyzing tomographic data in Radon space, comprising:
acquiring a tomographic projection data set from a tomographic imaging system;
identifying a feature of interest in the tomographic projection data set;
processing a reconstructed data set derived from the tomographic projection data set based upon the feature of interest such that the feature of interest is enhanced in the reconstructed data set.

22. The method as recited in claim 21, wherein processing the reconstructed data set comprises processing a two-dimensional data set.

23. The method as recited in claim 21, wherein processing the reconstructed data set comprises processing a three-dimensional data set.

24. A method for analyzing tomographic data comprising:
analyzing a tomographic data set via a first processing path;
identifying a feature of interest within the tomographic data set; and
processing a related tomographic data set via a second processing path based upon the feature of interest.

25. The method as recited in claim 24, wherein analyzing the tomographic data set comprises analyzing a set of tomographic projection data and wherein processing the related tomographic data set comprises processing a set of reconstructed image data.

26. The method as recited in claim 24, wherein analyzing the tomographic data set comprises analyzing a set of reconstructed image data and wherein processing the related tomographic data set comprises processing a set of tomographic projection data.

27. A tomographic mammography system comprising:
a tomographic scanner generally comprising a detector,
a computer system operably coupled to the tomographic scanner via a system controller and operably coupled to a memory element, an operator workstation, and one or more output devices, wherein the computer system is configured to acquire a tomographic data set from the tomographic scanner, segment the tomographic data set into one or more segmented data sets, process one or more features of the one or more segmented data sets to produce one or more feature-processed data sets, and provide the one or more feature-processed data sets to a reviewer.

28. The system as recited in claim 27, wherein the tomographic scanner further comprises a source.

29. The system as recited in claim 28, wherein the source is an injected radionucleotide.

30. The system as recited in claim 29, wherein the tomographic scanner is a PET mammography system.

31. The system as recited in claim 29, wherein the tomographic scanner is a nuclear medicine breast imaging system.

32. The system as recited in claim 28, wherein the tomographic scanner is a computed tomography mammography system.

33. The system as recited in claim 28, wherein the tomographic scanner is a thermoacoustic mammography system.

34. The system as recited in claim 28, wherein the tomographic scanner is an electrical impedance mammography system.

35. The system as recited in claim 28, wherein the tomographic scanner is a near-infrared mammography system.

36. The system as recited in claim 28, wherein the tomographic scanner is an X-ray tomosynthesis mammography system.

37. The system as recited in claim 27, wherein the computer system is configured to segment the tomographic data set based upon the manual delineation of one or more regions performed by an operator at the operator workstation.

38. The system as recited in claim 27, wherein the computer system is configured to segment the tomographic data set based upon the calculated delineation of one or more regions by a stored algorithm.

39. The system as recited in claim 27, wherein the computer system is configured to process one or more features of the one or more segmented data sets by extracting one or more features from the one or more segmented data sets.

40. The system as recited in claim 39, wherein the computer system is further configured to evaluate the one or more features using a distance criteria, rank the features based upon the distance criteria, eliminate one or more features based upon a degree of correlation, and optimize a selected feature set using a performance algorithm to produce the one or more feature-processed data sets.

41. The system as recited in claim 27, wherein the computer system is further configured to classify each of the one or more features of the one or more feature-processed data sets based upon one or more feature measurements of each feature to produce the one or more feature-processed data sets.

42. The system as recited in claim 41, wherein the computer system is configured to classify the one or more features by normalizing the feature measurements based upon two or more prior measurements of known normal and abnormal features; grouping the one or more features based upon their normalized feature measurements, and labeling the groups of one or more features.

43. The system as recited in claim 27, wherein the computer system provides the one or more feature-processed data sets to the reviewer by displaying the one or more feature-processed data sets to an operator via the one or more output devices.

44. The system as recited in claim 27, wherein the computer system provides the one or more feature-processed data sets to the reviewer by providing the one or more feature-processed data sets to a subsequent automated process located within the computer or on a remote client for at least one of further processing and analysis.

45. The system as recited in claim 27, wherein the computer system provides the one or more feature-processed data sets to the reviewer such that one or more markers are superposed on the feature-processed data set.

46. The system as recited in claim 45, wherein the one or more markers convey at least one of a feature classification, a classification probability, and a three-dimensional location.

47. A tomographic imaging system comprising:
a tomographic scanner generally comprising a source and a detector;
a computer system operably coupled to the tomographic scanner via a system controller and operably coupled to a memory element, an operator workstation, and one or more output devices, wherein; the computer system is configured to analyze a tomographic data set via a first processing path, identify a feature of interest within the tomographic data set; and process a related tomographic data set via a second processing path based upon the feature of interest.

48. A tomographic mammography system comprising:
a means for acquiring a tomographic image data set;
a means for segmenting the tomographic image data set into one or more segmented data sets;
a means for processing one or more features of the one or more segmented data sets to produce one or more feature-processed data sets; and
a means for providing the one or more feature-processed data sets to a reviewer.

49. The system as recited in claim 38, further comprising a means for classifying each of the one or more features to produce the one or more feature-processed data sets.

50. A tangible medium for analyzing mammography data acquired by a tomographic system, comprising:
a routine for acquiring a tomographic data set from a tomographic mammography system;
a routine for segmenting the tomographic data set into one or more segmented data sets;
a routing for processing one or more features of the one or more segmented data sets to produce one or more feature-processed data sets; and
a routine for providing the one or more feature-processed data sets to a reviewer.

51. The tangible medium as recited in claim 50, wherein the routine for segmenting the tomographic data comprises segmenting the tomographic data based upon the manual delineation of one or more regions by an operator.

52. The tangible medium as recited in claim 50, wherein the routine for segmenting the tomographic data comprises segmenting the tomographic data based upon the automated delineation of one or more regions by an automated algorithm.

53. The tangible medium as recited in claim 50, wherein the routine for processing one or more features of the one or more segmented data sets comprises extracting one or more features from the one or more segmented data sets.

54. The tangible medium as recited in claim 53, wherein the routine for processing one or more features of the one or more segmented data sets further comprises at least one of evaluating the one or more features using a distance criteria, ranking the features based upon the distance criteria, eliminating one or more features based upon a degree of correlation, optimizing a selected feature set using a performance algorithm to produce the one or more feature-processed data sets.

55. The tangible medium as recited in claim 54, further comprising a routine for training a processing system to process the one or more features of the one or more segmented data sets.

56. The tangible medium as recited in claim 50, further comprising a routine for classifying each of the one or more features of the one or more feature-processed data sets based upon one or more feature measurements of each feature to produce the one or more feature-processed data sets.

57. The tangible medium as recited in claim 56, wherein the routine for classifying the one or more features comprises normalizing the feature measurements based upon two or more prior measurements of known normal and abnormal features; grouping the one or more features based upon their normalized feature measurements, and labeling the groups of one or more features.

58. The tangible medium as recited in claim 57, wherein at least one of grouping the one or more features and labeling the groups is performed by an automated algorithm utilizing one or more stored data sets.

59. The tangible medium as recited in claim 50, wherein the routine for providing the one or more feature-processed data sets to the reviewer comprises displaying the one or more feature-processed data sets to an operator for review.

60. The tangible medium as recited in claim 50, wherein the routine for providing the one or more feature-processed data sets to the reviewer comprises providing the one or more feature-processed data sets to a subsequent automated process for at least one of further processing and analysis.

61. The tangible medium as recited in claim 50, wherein the routine for providing the one or more feature-processed data sets to the reviewer comprises superposing one or more markers on the feature-processed data sets.

62. The tangible medium as recited in claim 61, wherein the one or more markers comprises at least one of a feature classification, a classification probability, and a three-dimensional location.

* * * * *